United States Patent [19]
Piscaer

[11] Patent Number: 5,826,622
[45] Date of Patent: Oct. 27, 1998

[54] LIQUID FLOW PATH SELECTION DEVICE

[75] Inventor: Petrus Josephus Carolus Piscaer, Rotterdam, Netherlands

[73] Assignee: Sara Lee/DE N.V., Utrecht, Netherlands

[21] Appl. No.: 756,890

[22] Filed: Dec. 2, 1996

[30] Foreign Application Priority Data

Nov. 30, 1995 [NL] Netherlands .......................... 1001798

[51] Int. Cl.⁶ .................................................. F16K 11/02
[52] U.S. Cl. .......................................... 137/875; 251/342
[58] Field of Search ............................. 137/625.44, 875; 251/342

[56] References Cited

U.S. PATENT DOCUMENTS

| | | | |
|---|---|---|---|
| 3,378,206 | 4/1968 | Poc et al. | 137/875 X |
| 3,464,209 | 9/1969 | Redditt | 514/323 |
| 3,972,344 | 8/1976 | Chauvigné | 137/625.44 X |
| 4,073,316 | 2/1978 | Nyström | 251/342 X |
| 4,943,184 | 7/1990 | Humpherys | 405/39 |

FOREIGN PATENT DOCUMENTS

| | | |
|---|---|---|
| 506962 | 1/1980 | Australia . |
| 794282 | 5/1973 | Belgium . |
| 522719 | 4/1931 | Germany . |
| 33 46 280 | 2/1985 | Germany . |

*Primary Examiner*—John Fox
*Attorney, Agent, or Firm*—Merchant, Gould, Smith, Edell, Welter & Schmidt, P.A.

[57] ABSTRACT

A liquid flow path selection device comprises a feed channel and a housing having a first and a second continuation channel. The device further comprises a flexible, sheet-shaped selection element having a first and a second side, opposite each other, wherein at least a portion of the selection element forms a partition between the first and the second continuation channel. The selection element is connected to the housing along at least a portion of its circumferential edge. The selection element and the housing have such dimensions relative to each other that the selection element is movable between a first and a second extreme position in such a manner that in a first extreme position, the first side forms a concave surface guiding a flow of liquid from the feed channel into the first continuation channel and in a second extreme position, the second side forms a concave surface guiding a flow of liquid from the feed channel into the second continuation channel.

20 Claims, 6 Drawing Sheets

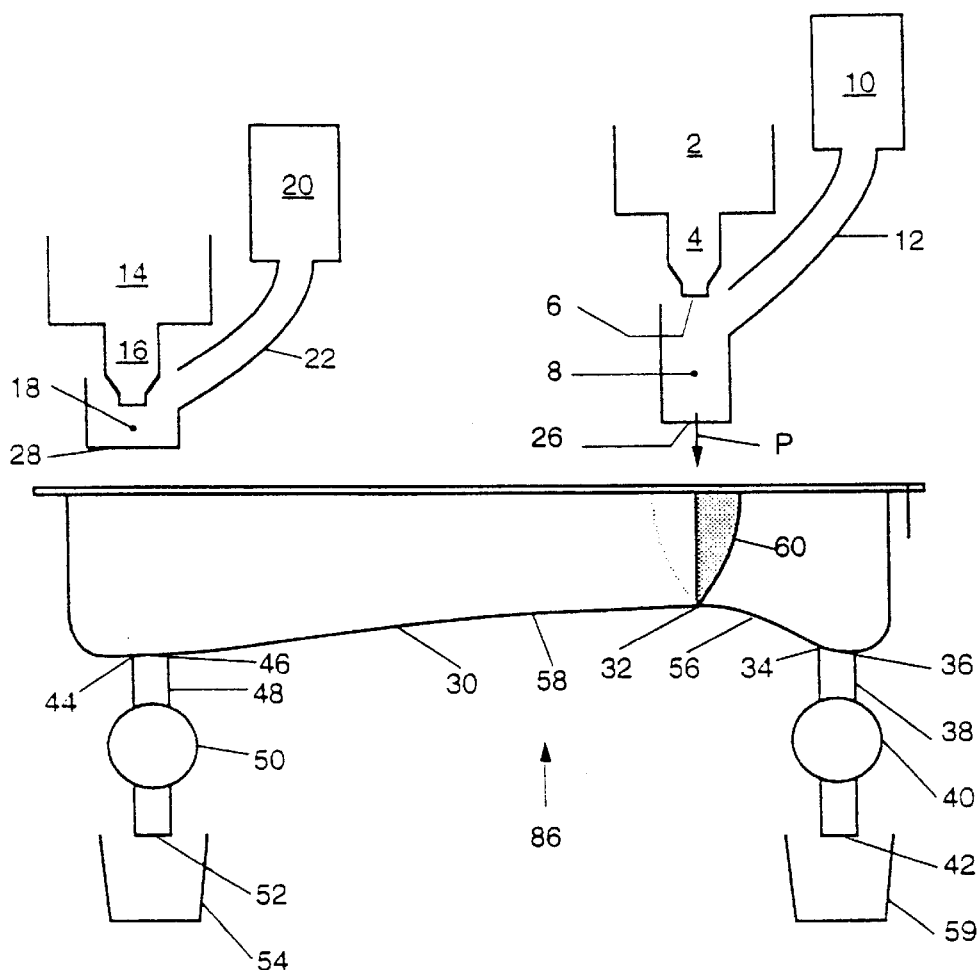
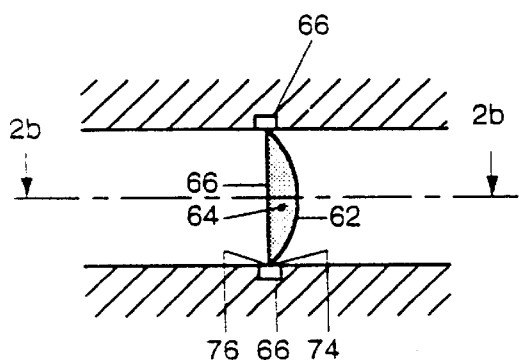
Fig. 2a
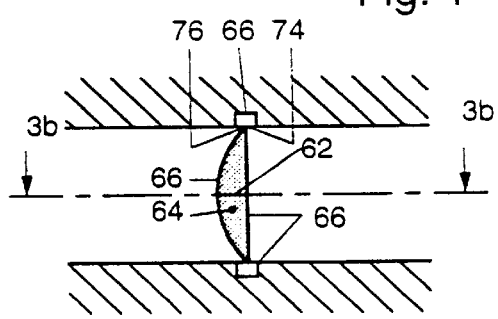
Fig. 3a
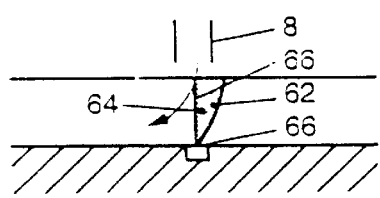
Fig. 2b
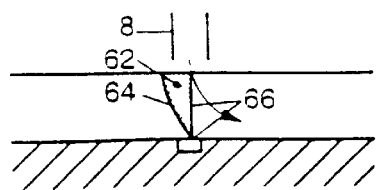
Fig. 3B
Fig. 1

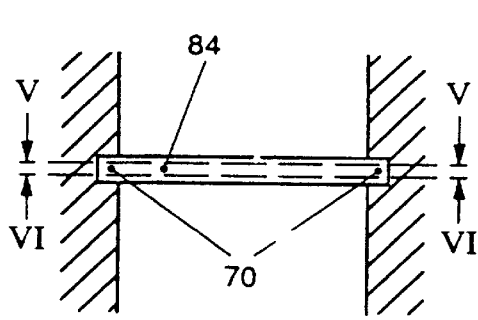
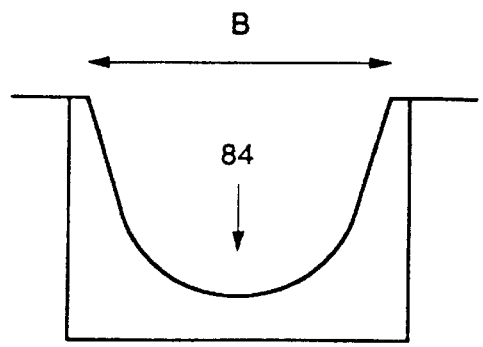
Fig. 4    Fig. 5
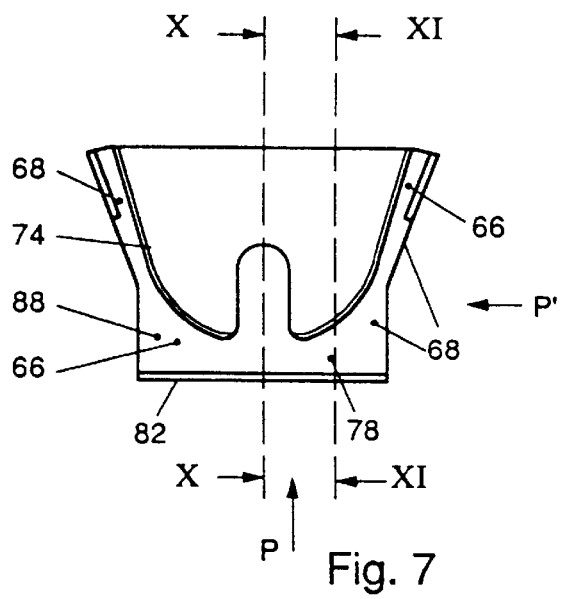
Fig. 7
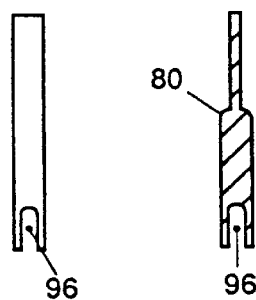
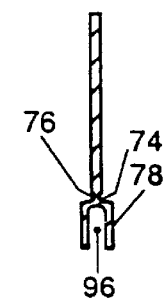
Fig. 6
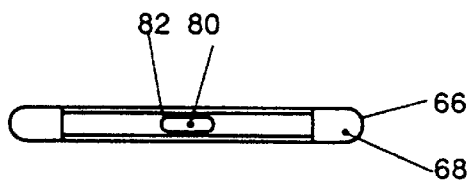
Fig. 8    Fig. 9    Fig. 10    Fig. 11

LIQUID FLOW PATH SELECTION DEVICE

The invention relates to a liquid flow path selection device comprising a feed channel and a housing which, at least on an inner side of the housing, forms a first and a second continuation channel located downstream of the feed channel. Such devices are known per se and further comprise a two-position valve, known per se, which in a first position causes liquid to flow from the feed channel to the first continuation channel, and in a second position causes liquid to flow from the feed channel to the second continuation channel. A known example of a device operating according to this principle is a bath tap which in the first position sends water to a tap opening for filling the bath, and in a second position sends the water to a shower head.

A problem of such known types of devices is that they are fairly costly. Further, these devices are not suitable for quickly changing between the first and the second position. Moreover, for controlling the valve, fairly great forces are generally required and when it is used frequently, the valve is subject to wear.

These problems are experienced as highly disadvantageous in particular when the device is for instance used in an apparatus—such as a coffee and tea machine—for selectively preparing beverages—such as coffee, tea and chocolate—which are suitable for consumption. In such apparatus, it is often desired that the path of a flow of liquid, such as for instance hot water, to be followed, be selected for selecting a beverage to be prepared.

The object of the invention is to provide a selection device of a type which is completely different from the device wherein the known valve is used, and which moreover provides a solution to the drawbacks mentioned.

Accordingly, the selection device according to the invention is characterized in that the device further comprises a flexible, sheet-shaped selection element having a first and a second side, opposite each other, wherein at least a portion of the selection element forms a partition between the first and the second continuation channel, the selection element is connected to the housing along at least a portion of its circumferential edge, and wherein the selection element and the housing have dimensions relative to each other so that the selection element is movable between a first and a second extreme position, in such a manner that in a first extreme position of the selection element, the first side forms a concave surface which guides a flow of liquid from the feed channel into the first continuation channel, and that in a second extreme position of the selection element, the second side forms a concave surface which guides a flow of liquid from the feed channel into the second continuation channel.

The flexible, sheet-shaped selection element is an economically highly advantageous part of the selection device. Moving the selection element from the first extreme position into the second extreme position and vice versa can be effected with a very slight force. Moreover, the selection element does not comprise any parts that move along each other, so that wear through movement of the selection element between the extreme positions is negligibly little. An additional advantage is that the operation of the selection element is particularly reliable. The above-described properties of the selection element render the selection device particularly suitable for being used in an apparatus for preparing beverages that are suitable for consumption.

Moreover, the selection device according to the invention has the property that the flow of liquid through the selection device is not necessarily caused by a liquid pressure, as is the case with taps. On account of this, the selection device is of an entirely different type from the known taps. Also, the selection device is suitable for being used for more purposes than the known devices. In general, the pressure of the liquid flowing through the selection device will even be atmospheric. In that case, the liquid flows for instance under atmospheric pressure through the selection device as a result of a given initial velocity when the liquid flows from the feed channel, as a result of gravity or as a result of a combination of these effects.

The selection device according to the invention further has as an advantage that switching from the first continuation channel to the second continuation channel and vice versa can be effected very quickly. Moreover, the selection element has the advantage that the flow of liquid, moving along the concave surface, will not spatter.

Preferably, the first and second extreme positions of the selection element are each a stable position of the selection element. Because a flexible, sheet-shaped material is used, this will generally be the case when the above-mentioned sides of the selection element are sufficiently curved in these extreme positions. This curvature is determined by the choice of the dimensions of the housing at the positions where the selection element has been attached to the housing relative to the dimensions of the selection element.

Hereinafter, the invention will be specified with reference to the accompanying drawings, wherein:

FIG. 1 shows a partial section of an apparatus for preparing hot beverages, the apparatus comprising a liquid flow path selection device according to the invention;

FIG. 2a is a top plan view of the selection device in the direction of the arrow P of FIG. 1, when the selection device is in a second extreme position;

FIG. 2b shows a second according to FIG. 2a;

FIG. 3a is a top plan view of the selection device in the direction of the arrow P of FIG. 1, when the selection device is in a first extreme position;

FIG. 3b shows a section according to FIG. 3a;

FIG. 4 is a top plan view of a part of the receiving dish of FIG. 1 in the direction of the arrow P, the selection element having been removed;

FIG. 5 shows a cross section according to FIG. 4;

FIG. 6 shows a cross section according to FIG. 4;

FIG. 7 shows a possible embodiment of the selection element of FIG. 1;

FIG. 8 is a bottom view of the selection element according to the arrow P in FIG. 7;

FIG. 9 shows a side elevation of the selection element of FIG. 7 according to the arrow P' of FIG. 7;

FIG. 10 shows a cross section according to FIG. 7;

FIG. 11 shows a cross section according to FIG. 7;

Figure 12:
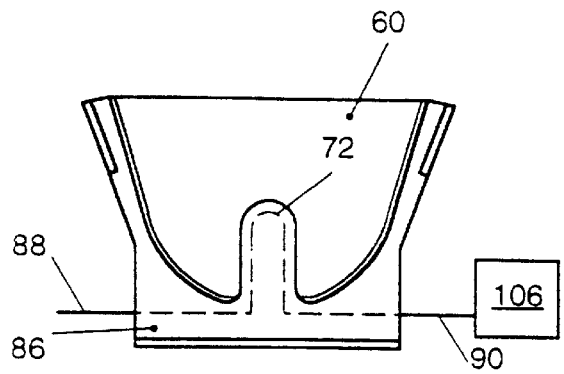
FIG. 12 shows the selection element of FIG. 1 in combination with a possible embodiment of a control element.

In FIGS. 1–16, by reference numeral 1 an apparatus is shown for preparing a beverage suitable for consumption, the apparatus comprising a liquid flow path selection device according to the invention. The devices comprises a schematically shown first holder 2 containing a coffee concentrate. Connected to the holder 2 is a first dosing unit 4 capable of releasing very accurately small amounts of coffee concentrate from the first holder. For this purpose, the first dosing unit 6 comprises an outlet 6 from which the coffee concentrate is released for subsequently flowing to a feed channel 8. The device further comprises a first hot-water unit 10, capable of dispensing hot water to the feed channel 8 via a conduit 12. In the feed channel 8, an amount of water is combined with the coffee concentrate for obtaining hot coffee.

The apparatus further comprises a second holder 14 which also contains a concentrate for, for instance, coffee or chocolate. Connected to the second holder 14 is a second dosing unit 16 for dispensing concentrate from the holder to a conveyance channel 18. There is further provided a second hot-water unit 20, capable of feeding hot water to the conveyance channel 18 via conduit 22. The dispensing of a concentrate by the second dosing unit and hot water by the second hot-water holder will take place simultaneously, so that concentrate and hot water are fed together to the conveyance channel 18.

The device further comprises a housing in the shape of a receiving dish 24, disposed under the outlets 26, 28 of the feed channel 8 and the conveyance channel 18 respectively. As is clearly visible in the drawing, the bottom 30 of the dish has a shape so that a highest point 32 of the bottom 30 is located directly below the outlet 26 of the feed channel 8. From the highest point 32, the dish slopes downwards to a locally lowest point 34 to the right of the highest point 32. The bottom 30 in the locally lowest point 34 is provided with a flow-out opening 36, which provides access to a first conduit 38. In the first conduit 38, a first mixer 40, known per se, is further provided. The first conduit 38 comprises an outlet 42 under which a cup can for instance be placed, which cup can be filled with coffee. At a side located opposite the side where the first locally lowest point 34 is located, the bottom 30 of the dish slopes downwards from the highest point 32 to a second locally lowest point 44. In the second locally lowest point 44, a flow-out opening 46 is provided, which provides access to a second conduit 48, wherein a second mixer 50 is provided. The second conduit 48 has a second outlet 52 under which a cup can likewise be placed for being filled with a prepared beverage.

A hot liquid flowing from the outlet 28 of the conveyance channel 18 will enter the portion of the receiving dish 24 that is located to the left of the highest point 32, and hence flow directly to the second lowest point 44. Then, via the second flow-out opening 46, the liquid will be conveyed to the mixer 50. In the mixer 50, the liquid consisting of the hot water and the extract, which extract comes from the holder 14, will be properly mixed, to be subsequently dispensed to a holder 54 placed under the second outlet 52.

However, the first outlet 26 is located precisely above the highest point 32 of the bottom 30 of the dish, so that the beverage that is dispensed via this outlet can, in principle, flow to the first lowest point 34 as well as to the second lowest point 44. In other words, the feed channel 8 connects to a first continuation channel leading to the first lowest point 34 and connects to a second continuation channel leading to the second lowest point 44. In this example, the first continuation channel is formed by the bottom part 56 of the bottom 30, which bottom part is located directly to the right of the highest point 32, while the second continuation channel is formed by the bottom part 58 of the bottom 30, which bottom part is located directly to the left of the highest point 32. If the liquid flows via the first continuation channel 56 to the first local lowest point 34 of the receiving dish 24, the liquid will be dispensed via conduit 38 and the mixer 40 through the outlet 42, to fill a holder 59 disposed under the outlet 42.

To enable determining whether the flow of liquid from the feed channel 8 is sent to the first continuation channel 56 or to the second continuation channel 58, the device further comprises a flexible, sheet-shaped selection element 60. The selection element 60 comprises a first 62 and a second 64 side located opposite each other (see FIGS. 2 and 3), and the selection element forms a partition between the first continuation channel 56 and the second continuation channel 58. Along a U-shaped portion 66 of its circumferential edge, the selection element 60 is connected to the receiving dish 24, and the selection element 60 and the receiving dish 24 have dimensions relative to each other so that the selection element is movable between a first and a second extreme position. In this example, the width b (see FIG. 7) of the stretched selection element is greater than the width B (see FIG. 5) of the portion of the receiving dish between which the selection element is fitted. As a consequence, the selection element 60, when it is located in the receiving dish, cannot be unbent. Hence, the selection element will be bent in the direction of the first continuation channel 56, as is shown in FIG. 2a, or bent in the direction of the second continuation channel 58, as is shown in FIG. 3a. In a first extreme position, as shown in FIG. 3a, the first side 62 has a concave surface, while in a second extreme position, as shown in FIG. 2a, the second side 64 has a concave surface. When the selection element is in the first extreme position, the flow of liquid will flow from the feed channel 8 (see FIG. 3b) to the first continuation channel 56 via the concave-shaped first side 62. If, on the other hand, the selection element is in the second extreme position, a flow of liquid will flow from the feed channel 8 to the second continuation channel 58 via the concave-shaped second side 64. Because the part of the selection element forming the first and the second side are of flexible and sheet-shaped design, the selection element can readily be moved from its first extreme position into its second extreme position, and vice versa. Thus, the flow of liquid can adjustably be sent from the feed channel 8 to the first continuation channel 56 or to the second continuation channel 58 in a very simple and effective manner. Because of the flexible characteristic of the selection element, the first and the second extreme position of the selection element are each a stable position of the selection element. In other words, the selection element will be either in its first extreme position or in its second extreme position when no further external force is exerted on the selection element. The selection element can for instance be manufactured from silicone rubber. To enable connecting the selection element to the receiving dish 24 so as to be liquid-tight, the bottom side and the upright side of the circumferential edge (the U-shaped portion 66) of the selection element are formed into a tongue 68 fitting in a groove 70 provided in the receiving dish 24. In this example, the portion 72 of the circumferential edge, located at the top side of the selection element, is not connected to the receiving dish. To facilitate the movement of the selection element from its first extreme position into its second extreme position and vice versa, in this example, a groove 74, 76 respectively has been provided on both sides 62, 64 of the selection element, extending along the U-shaped portion 66 of the circumferential edge. In this example, the grooves 74, 76 in the respectively sides 62, 64 are opposite each other. The grooves 74, 76 thus form a pivot, allowing the selection element to be easily moved between its first and its second extreme position. In this example, at least a portion 78, hatched in FIG. 7, is of double-walled design. The double-walled portion 78 encloses an inside space 80. The inside space 80 has an opening 82 in the bottom portion 84 of the U-shaped portion 66 of the circumferential edge. In a bottom side of the receiving dish 24, at the place where the selection element 60 is located, a passage 84 is present, which, from a bottom side 86 of the receiving dish and via the opening 82 in the selection element, provides access to the inside space 80 in the selection element. When the selection element has been mounted in the receiving dish 24, the bottom portion 88 of the U-shaped circumferential edge 66 will be enclosed by inner walls of the passage 84 in the receiving dish 24. As the tongue fits closely in the groove 70 and the inner walls of the passage 84 also closely enclose the relevant portion of the selection element, a liquid-tight seal is realized between the selection element 60 and the receiving dish 24. From the bottom side 86 of the receiving dish 24, a for instance bar-shaped operating element can now be introduced into the inside space 80, via the passage 84 and the opening 82 of the inside space 80, so that the bar-shaped element extends from the inside space 80 to the bottom side 86 of the receiving dish. This means, that through manipulation of the portion of the operating element located at the bottom side of the receiving dish 24, the selection element 60 can be moved from its first extreme position into its second extreme position and vice versa. A possible embodiment of the operating element 88 is shown in FIG. 12. The operating element comprises a bar-shaped shaft 90 extending parallel to the portion 86 of the circumferential edge located between the legs of the U-shaped portion 66 of the circumferential edge. Hence, it concerns the portion of the circumferential edge in which the access opening 82 is located. The operating element further comprises a finger-shaped part 92 which is connected to the bar-shaped shaft 90 and extends transversely to the bar-shaped shaft into the inside space 80 of the selection element 60. For simplicity's sake, only the selection element 60 and the operating element 88 are shown in FIG. 12. For the sake of assembling, the selection element 60 will, in practice, be slid into the space of the receiving dish. Then, the operating element will be arranged from the bottom side of the receiving dish, as is shown in FIG. 12. The operating element 88 is connected to the receiving dish 24 for rotation about a rotary shaft, which rotary shaft extends at least substantially parallel to the portion 86 of the circumferential edge between the legs of the U-shaped circumferential edge. By rotating the operating element 88 back and forth about its shaft 90, the finger-shaped portion 92 will make a translating motion which can cause the selection element 60 to move from its first extreme position into its second extreme position and vice versa.

Figure 14:
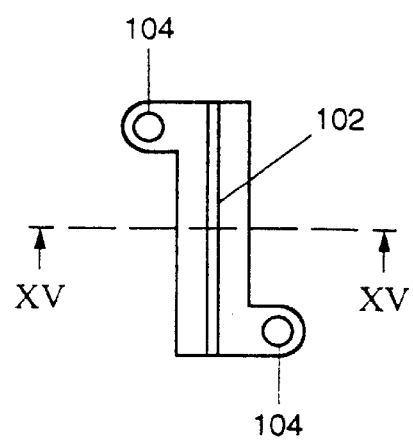
FIG. 14 is a top plan view of the fastening element in the direction of the arrow P according to FIG. 13.
Figure 13:
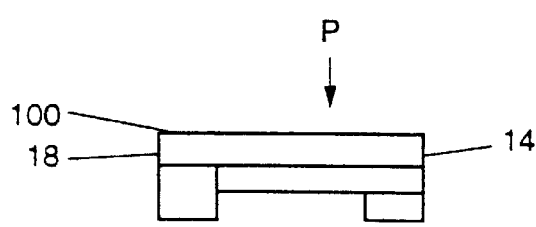
FIG. 13 shows a fastening element for bearing-mounting the control element of FIG. 1.
Figure 15:
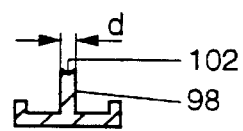
FIG. 15 shows a cross section according to FIG. 13.

To enable the operating element 88 to be rotatably connected to the receiving dish 24, a mounting element 94 is connected to the receiving dish 24 from the bottom side 86 of the housing, in such a manner that the operating element 88 is bearing-mounted between the mounting element 94 on the one hand and the selection element 60 on the other. A possible embodiment of the mounting element is shown in FIGS. 13–15. For this purpose, a groove 96 is present in the portion of the circumferential edge that is enclosed by the passage 84, in which groove the operating element 88 is bearing-mounted. In mounted condition, the fastening element 94 extends from the bottom side of the receiving dish 24 into the groove 96 of the circumferential edge. The portion 98 of the fastening element 94 extending into the groove 96 has a thickness d (see FIG. 15) so that the relevant portion of the circumferential edge is pressed against the above-mentioned inner walls of the passage 84 by the portion 98 of the fastening element 94. It is thus provided that the selection element is detachably connected to the receiving dish 24, while, moreover, the liquid-tight seal is guaranteed.

For bearing-mounting the operating element 88 in the fastening element 94, a guiding groove 102 is present in an end face 100 of the portion of the fastening element which extends into the passage, in which guiding groove 102 the bar-shaped shaft 90 is rotatably accommodated.

Figures 16A, 16B:
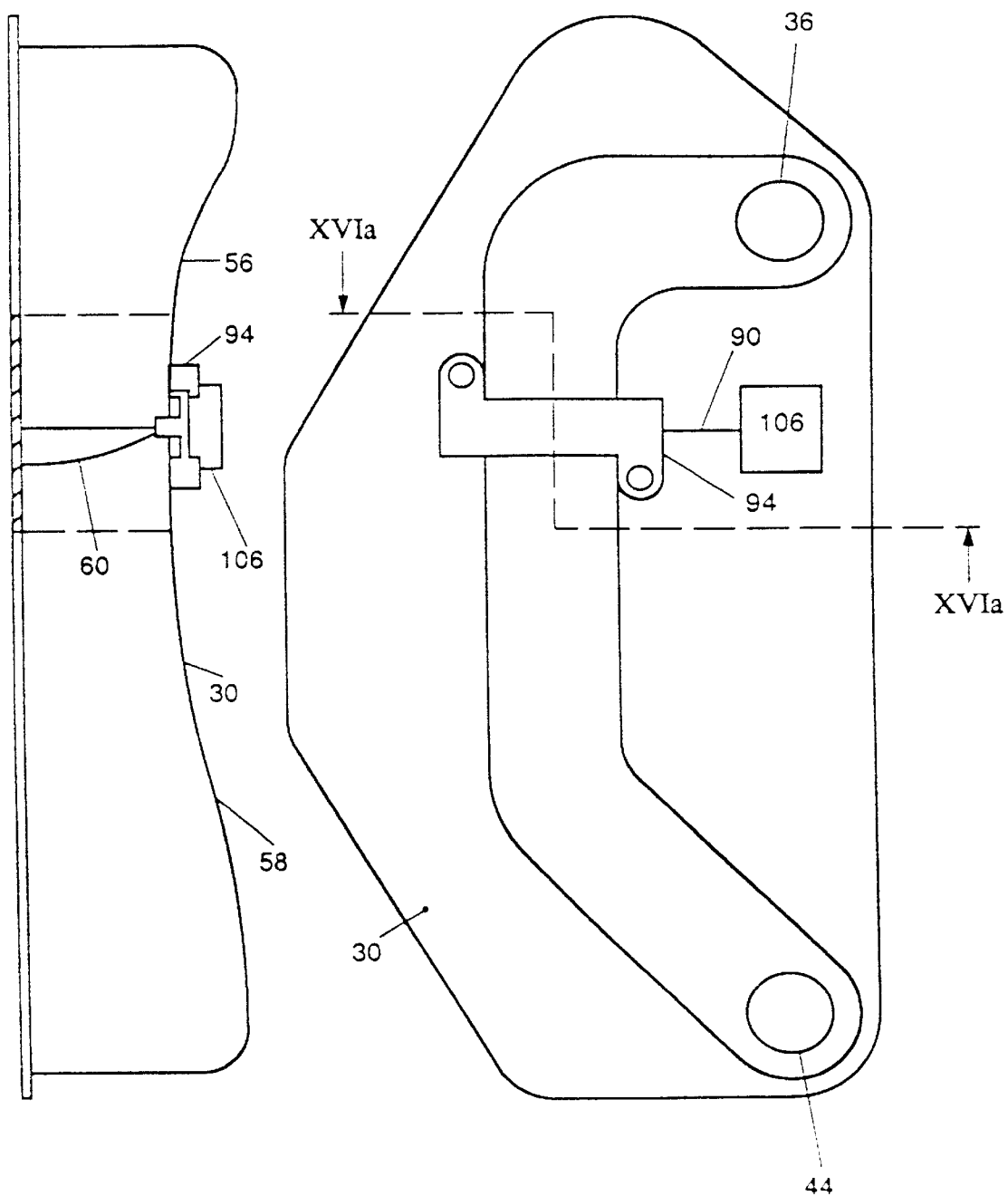
FIG. 16a shows a side elevation and partial section of the receiving dish 24 of FIG. 1, wherein the selection element, the fastening element and the operating element have been mounted, but the mixers have been left out.
FIG. 16b is a bottom view and partial section of the receiving dish 24 of FIG. 1, wherein the selection element, the fastening element and the operating element have been mounted, but the mixers have been left out.
Figure 16C:
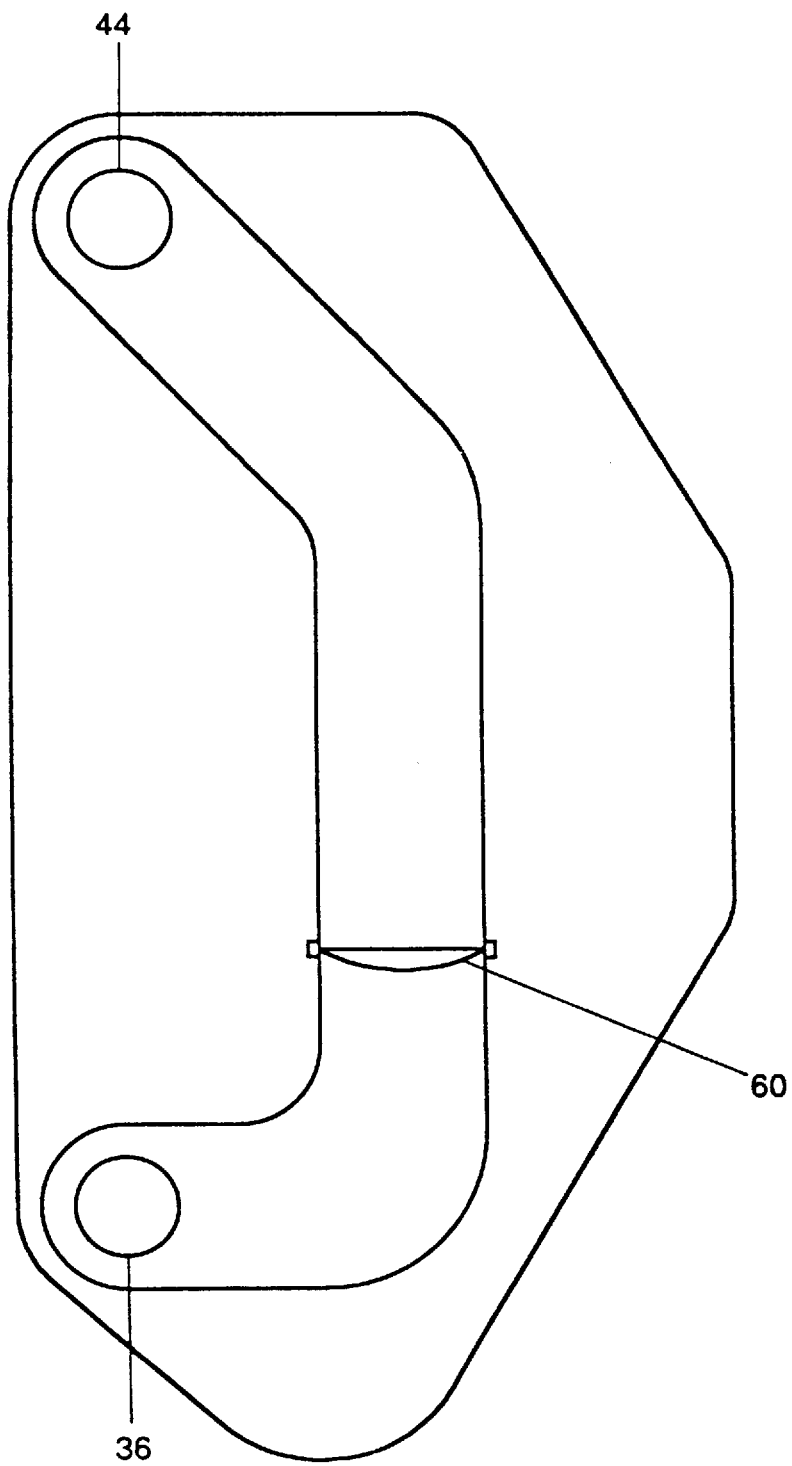
FIG. 16c is a top plan view and partial section of the receiving dish 24 of FIG. 1, wherein the selection element, the fastening element and the operating element have been mounted, but the mixers have been left out.

As can be seen in FIG. 14, the fastening element 94 further has two screw holes 104 for mounting the fastening element to the bottom side of the receiving dish 24 by means of screws. FIG. 16 is a bottom view wherein the receiving dish has been provided with the selection element, the operating element 88 and the fastening element 94 in marked condition.

For rotating the bar-shaped shaft 90, the device can further comprise a direct-current motor, known per se. The direct-current motor can for instance control a reduction bear unit. and in turn, the reduction gear unit rotates the bar-shaped shaft so that the selection element is conveyed from its first extreme position into its second extreme position and vice versa. In FIG. 12, these driving means are schematically represented by reference numeral 106.

If in the apparatus of FIG. 1, the holder 2 and the holder 14 both contain coffee extract, the apparatus can be used as follows.

When a small a mount of coffee is to be prepared for, for instance, filling one cup 59, the cup 59 can be filled with coffee prepared with extract coming from the first holder 2. The selection element is then in its first extreme position. Also, a cup 54 can be filled by means of coffee extract coming from the second holder 14. On the other hand, when it is desired to prepare a larger amount of coffee, a coffee pot 54 can for instance be filled with a double amount of coffee flowing more or less simultaneously from outlets 26 and 28. The selection element 60 is then in its second extreme position, so that the coffee flowing from the outlet 26 will likewise flow to the mixer 50.

In this example, it is possible to provide the mixer 50 with a double amount of coffee. Of course, it is also possible to provide, for instance, the second holder 14 with a chocolate extract. In that case, it is possible to dispense coffee via the outlet 42 and to dispense both coffee and chocolate via the outlet 52. Also, the first holder can be filled with a milk extract and the second holder can be filled with a coffee extract. Via the outlet 42, milk can then be dispensed, while via the outlet 52, black coffee, coffee with milk, or milk can selectively be dispensed. Such variants are all understood to fall within the framework of the invention.

Figure 17:
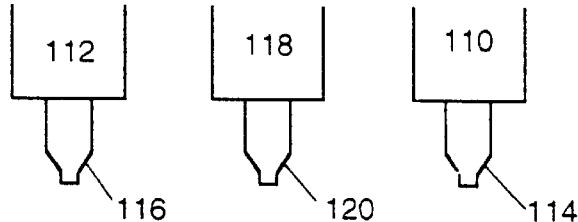
FIG. 17 shows a second embodiment of an apparatus having a selection device according to the invention.
Figure 17:
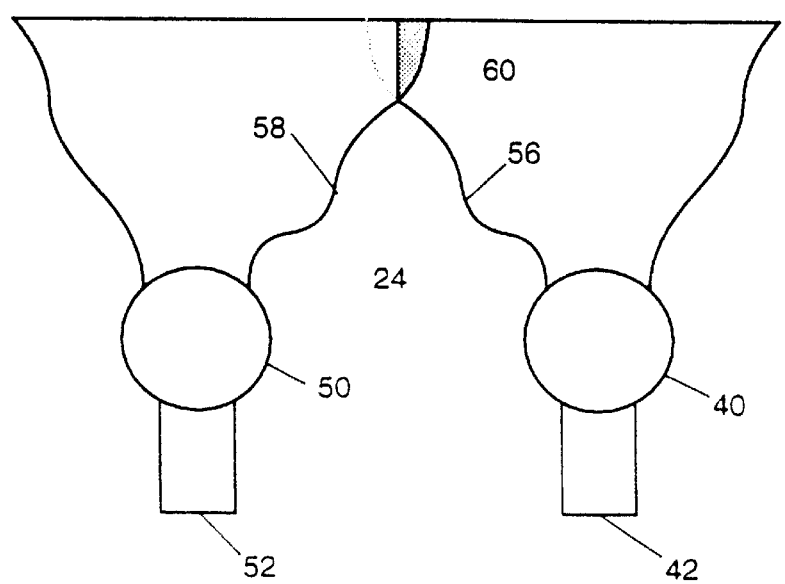

It will be understood that the liquid flow path selection device, in this example described in combination with an apparatus for preparing hot beverages, can also be used in other apparatus, wherein it is necessary to send the flow of liquid dispensed from a feed channel to a first or a second continuation channel in a settable manner. FIG. 17 summarily shows another application. The apparatus according to FIG. 17 comprises a first concentrate holder 110, wherein for instance coffee concentrate is present, and a second concentrate holder 112, wherein for instance chocolate concentrate is present. The first and second concentrate holders each comprise a dosing unit 114, 116 for dispensing a predetermined and settable amount of concentrate. Further, the apparatus comprises a hot-water unit 118, capable of dispensing an amount of hot water via an outlet 120. The apparatus further comprises a receiving dish 24 which is comparable with the receiving dish as described in relation to FIGS. 1–16. Corresponding parts have been provided with identical reference numerals. The operation of the apparatus is as follows. When it is desired that coffee be prepared, the selection element 60 is brought into its first extreme position. Then, the dosing unit 114 and the hot-water unit 118 respectively dispense an amount of coffee extract and an amount of hot water respectively. The coffee extract will flow directly to the mixer 40. Also, the amount of hot water dispensed will flow via the selection element 60 to the first continuation channel 56, so that hot water is fed to the mixer 40. In the mixer 40, the coffee extract and the hot water will be mixed properly, after which hot coffee is dispensed via outlet 42.

When it is desired that chocolate be prepared, an amount of chocolate extract is dispensed by the dosing unit 116, which amount will flow directly to the mixer 50. Also, the selection element 60 is brought into its second extreme position. When, next, an amount of hot water is dispensed by the hot-water unit 118, it will be fed to the second continuation channel 58 by the selection element 60. Hence, via the second continuation channel 58, the hot water will be fed to the mixer 50 as well. In the mixer 50, the chocolate concentrate and the hot water are mixed together, so that, next, hot chocolate can be dispensed via outlet 52. The advantage of the apparatus according to FIG. 17 is that only one hot-water unit is necessary, which can be used both for preparing coffee and for preparing chocolate.

The selection device is by no means limited to the embodiment as described hereinabove. For instance, the selection device can also take up spatial orientations other than those shown in the above-discussed examples. For instance, it is possible that the feed channel dispenses a flow of liquid which moves in horizontal direction. When the selection element 60 is mounted in a first and second continuation channel in such a manner that, for instance, the portion 72 of the circumferential edge is directed vertically, the selection element can readily select the liquid flow path to be followed.

Figure 18:
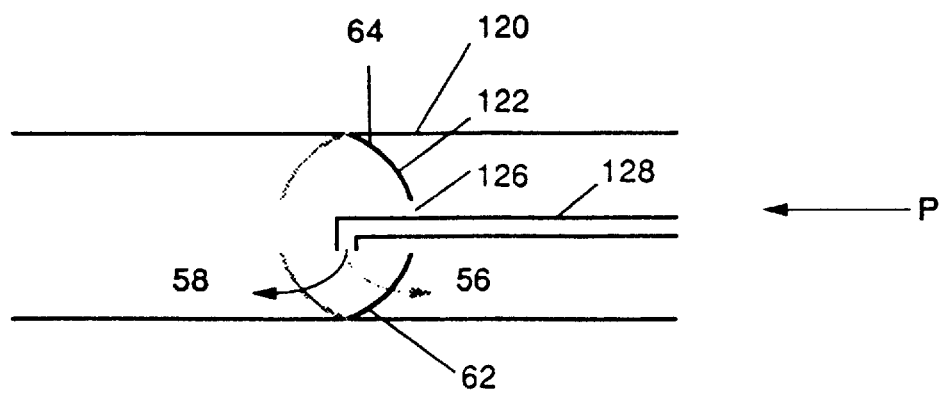
FIG. 18 shows a longitudinal section of an alternative embodiment of a selection device according to the invention.
Figure 19:
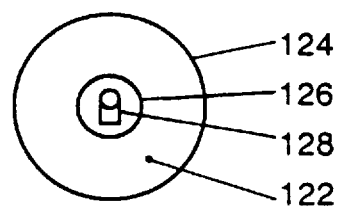
FIG. 19 is a view of the selection device according to FIG. 18 in the direction of the arrow P of FIG. 18.

The portion of the circumferential edge of the selection element whereby the selection element is connected to the housing can of course also be of V or C-shaped design. It is also possible that the selection element is connected to the housing along its entire circumferential edge. In that case, the housing can for instance consist of a round tube, of which a possible embodiment is shown in FIGS. 18 and 19. The device comprises a tube 120 wherein a round, flexible selection element 122 is provided. The selection element 122 is connected to the tube 120 along its entire longitudinal edge 124. Provided in the selection element 122 is a round opening 126. Located within the tube 120 is an inside tube 128 having an open end bent over in the direction of the inner wall of the tube 120. When the flexible element 122 is in its second extreme position, as shown in FIG. 17, a jet of liquid will flow via the second side 64 to a continuation channel 58 formed by the portion of the inside tube 120, bent on the left-hand side of the selection element 122. When the selection element 122 is manipulated into its first extreme position, as shown in dotted lines in FIG. 18, the flow of liquid from the feed channel 128 will flow to the first continuation channel 56 via the second side 62. Moving the selection element 122 back and forth between the first and the second extreme position can for instance be carried out completely analogously, as discussed in relation to FIGS. 1–16. Such variants are all understood to fall within the framework of the invention.

What is claimed is:

1. A liquid flow path selection device comprising a feed channel and a housing which, at least on an inner side of the housing, forms a first and a second continuation channel located downstream of the feed channel, wherein the device further comprises a flexible, sheet-shaped selection element having a first and a second side, opposite each other, wherein at least a portion of the selection element forms a partition between the first and the second continuation channel, the selection element is connected to the housing along at least a portion of its circumferential edge, and wherein the selection element and the housing have such dimensions relative to each other that the selection element is movable between a first and a second extreme position in such a manner that in a first extreme position of the selection element, the first side forms a concave surface guiding a flow of liquid from the feed channel into the first continuation channel and in a second extreme position of the selection element, the second side forms a concave surface guiding a flow of liquid from the feed channel into the second continuation channel.

2. A device according to claim 1, characterized in that the first and second extreme positions of the selection element are each a stable position of the selection element.

3. A device according to claim 1, characterized in that the selection element is connected to the housing along a U, V, or C-shaped portion of its circumferential edge.

4. A device according to claim 1, characterized in that at least a portion of said circumferential edge of the selection element is formed by a tongue fitting in a groove provided in the housing.

5. A device according to claim 3, characterized in that the tongue and groove extend according to the U, V or C-shape.

6. A device according to claim 1, characterized in that in at least one side of the selection element, a groove is present that extends along said circumferential edge.

7. A device according to claim 6, characterized in that the groove extends substantially along the tongue.

8. A device according to claim 6, characterized in that on either side grooves are present that lie opposite each other.

9. A device according to claim 1, characterized in that at least a portion of the selection element is of double-walled design, wherein the double-walled portion encloses an inside space with an access opening present in the circumferential edge.

10. A device according to claim 9, characterized in that the device further comprises a movable operating element which extends via the access opening into the inside space of the selection element for moving, by means of the operating element, the selection element between the first and the second position.

11. A device according to claim 9, characterized in that in the housing a passage is present which, from an outer side of the housing and via the opening in the selection element, provides access to the inside space of the selection element.

12. A device according to claim 11, characterized in that a portion of the longitudinal edge of the selection element in which the access opening of the selection element is located, is enclosed by inner walls of the passage in the housing.

13. A device according to claim 12, characterized in that the inner walls of the passage in the housing enclose said portion of the circumferential edge so as to be liquid-tight.

14. A device according to claim 10, characterized in that the movable operating element extends from an outer side of the housing via the passage in the housing and the access opening in the selection element respectively, into the inside space of the selection element.

15. A device according to claim 5, characterized in that the access opening of the selection element is located in a portion of the circumferential edge lying between the legs of the U, V or C-shaped circumferential edge.

16. A device according to claim 15, characterized in that the operating element is connected to the housing for rotation about a rotary shaft, wherein the rotary shaft extends at least substantially parallel to the portion of the circumferential edge which lies between the legs of the U, V or C-shaped circumferential edge and in which the access opening is located.

17. A device according to claim 16, characterized in that the rotary shaft and the legs of the U, V or C-shaped circumferential edge are at least substantially in one plane.

18. A device according to claim 17, characterized in that the operating element comprises a bar-shaped shaft which, on the outer side of the housing, is rotatably connected to the housing, and a finger-shaped part connected to the bar-shaped shaft and extending transversely to the bar-shaped shaft into the inside space of the selection element.

19. A device according to claim 13, characterized in that in the portion of the circumferential edge enclosed by the passage of the housing, a groove is present in which the bar-shaped shaft of the operating element is located, and wherein the housing further comprises a fastening element extending from the outer side of the housing into the groove of the circumferential edge, wherein the portion of the fastening element which extends into the groove has a dimension such that the circumferential edge is pressed against the inner walls of the passage by the fastening element, and wherein, in an end face of the portion of the fastening element extending into the passage, a guiding groove is present in which the bar-shaped shaft is rotatably accommodated.

20. A housing comprising a selection element for use in a device according to claim 1.

* * * * *